(12) United States Patent
Kholodkov et al.

(10) Patent No.: US 12,020,015 B2
(45) Date of Patent: Jun. 25, 2024

(54) PARTITIONED DEPLOYMENT OF UPDATES TO CLOUD SERVICE BASED ON CENTERALLY UPDATED CONFIGURATION STORE

(71) Applicant: Microsoft Technology Licensing, LLC, Redmond, WA (US)

(72) Inventors: Dmitry Valentinovich Kholodkov, Seattle, WA (US); Rahul Nigam, Bothell, WA (US); Nidhi Verma, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 182 days.

(21) Appl. No.: 17/574,321

(22) Filed: Jan. 12, 2022

(65) Prior Publication Data

US 2023/0221941 A1    Jul. 13, 2023

(51) Int. Cl.
*G06F 8/65* (2018.01)
*G06F 8/61* (2018.01)

(52) U.S. Cl.
CPC . *G06F 8/65* (2013.01); *G06F 8/61* (2013.01)

(58) Field of Classification Search
CPC .................................................. G06F 8/60–66
See application file for complete search history.

(56) References Cited

U.S. PATENT DOCUMENTS

| 9,176,728 | B1 | 11/2015 | Dixit et al. |
| 10,095,501 | B2 | 10/2018 | Kuchibhotla et al. |
| 10,129,084 | B1 | 11/2018 | Nekrashevych et al. |
| 10,162,650 | B2 | 12/2018 | Frank et al. |

(Continued)

FOREIGN PATENT DOCUMENTS

| CN | 113641388 A | * | 11/2021 |
| WO | 2020091592 A1 | | 5/2020 |

OTHER PUBLICATIONS

Machine Translation of CN 113641388, Espacenet (online), 2023 [retrieved Nov. 18, 2023], Retrieved from Internet: <URL:https://translationportal.epo.org/emtp/translate?https://worldwide.espacenet.com/publicationDetails/description?CC=CN&NR=113641388A&KC=A&FT=D&ND=3&date=20211112&DB=EPODOC&locale=en_EP>, pp. 1-19.*

(Continued)

*Primary Examiner* — Todd Aguilera
(74) *Attorney, Agent, or Firm* — NovoTechIP International PLLC

(57) ABSTRACT

A data processing system implements obtaining policy information for an update to be deployed to one or more components of a cloud-based service identifying a plurality of rings of the cloud-based service to which the update is to be deployed; analyzing the policy information to determine configuration information for a plurality of installer instances each associated with one or more rings or one or more stages of a ring to which the update is to be deployed; obtaining payload information for each respective installer instance, the payload information indicating one or more payloads associated with the update to be deployed to the respective one or more rings or one or more stages of the ring associated with the respective installer instance; and deploying the one or more payloads for each of the one or more rings or the one or more stages of the ring associated with each installer instance.

18 Claims, 13 Drawing Sheets

(56) References Cited

U.S. PATENT DOCUMENTS

| | | | |
|---|---|---|---|
| 11,194,566 B1 | 12/2021 | Gabrielson | |
| 11,271,801 B2* | 3/2022 | Obaidi | H04L 41/0661 |
| 11,768,672 B1* | 9/2023 | Silakov | G06F 8/65 |
| | | | 717/172 |
| 11,782,695 B2* | 10/2023 | Verma | G06N 20/00 |
| | | | 717/172 |
| 2005/0091346 A1 | 4/2005 | Krishnaswami et al. | |
| 2018/0143821 A1 | 5/2018 | Chittigala et al. | |
| 2018/0307480 A1 | 10/2018 | Doyle et al. | |
| 2020/0007385 A1* | 1/2020 | Obaidi | H04L 63/1425 |
| 2020/0379744 A1 | 12/2020 | Bhupati et al. | |

OTHER PUBLICATIONS

"International Search Report and Written Opinion Issued in PCT Application No. PCT/US22/048122", dated Feb. 6, 2023, 15 Pages.
Schaub, Willy-Peter, "Deploying New Releases: Feature Flags or Rings?", Retrieved From: https://opensource.com/article/18/2/feature-flags-ring-deployment-model, Feb. 8, 2018, 8 Pages.
"User Guide for Cisco Security Manager 4.22", Retrieved from: https://www.cisco.com/c/en/us/td/docs/security/security_management/cisco_security_manager/security_manager/422/user/csm-user-guide-422/chapter5-managing-policies.html, Nov. 10, 2020, 2984 Pages.
Flores, John, "Configure Conditional Access Policies using Templates Based on Microsoft Graph APIs", Retrieved from: https://github.com/Azure-Samples/azure-ad-conditional-access-apis/blob/main/01-configure/templates/readme.md, Sep. 22, 2020, 25 Pages.

* cited by examiner

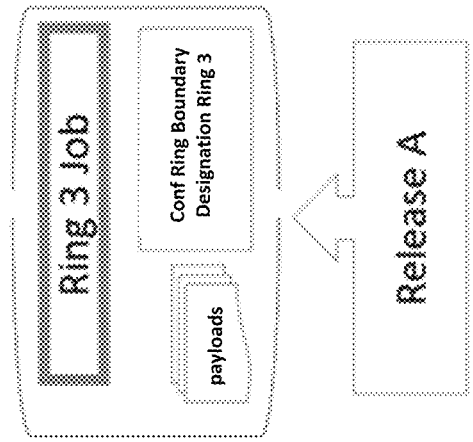
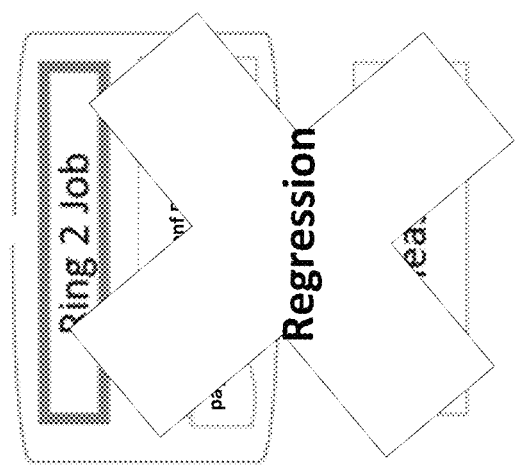
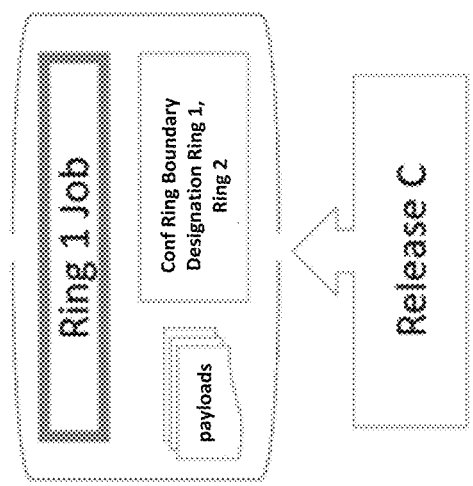
FIG. 5C

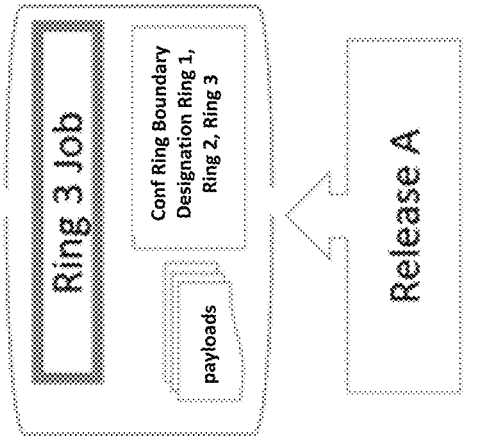
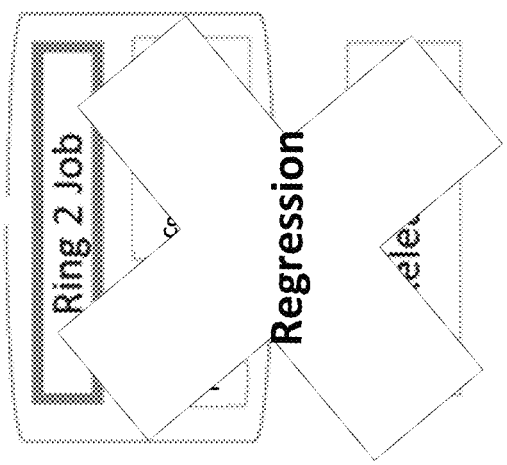
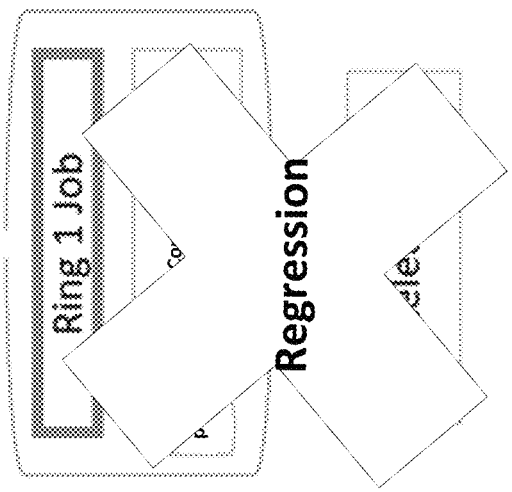
FIG. 5D

Deployment Configuration

Build Information

20211212_B125_App1-Update

Deployment Targets: Select one or more deployment targets to which the update is to be deployed.

- ■ Ring 1
- ☐ Ring 2
- ☐ Ring 3, Stage 1
- ☐ Ring 3, Stage 2

Schedule Deployment: The updates may be scheduled to be deployed immediately or deferred to a particular day and time.

- ■ Deploy Now
- ☐ Deferred Deployment
  Observational

MM/DD/YYYY HH:MM

[ Close ]  [ Reset Parameters ]  [ Deploy Update ]

PARTITIONED DEPLOYMENT OF UPDATES TO CLOUD SERVICE BASED ON CENTERALLY UPDATED CONFIGURATION STORE

BACKGROUND

Cloud-based services provide computing services over the Internet or a dedicated network. The cloud-based services may provide computing resources, analytics, storage, and network resources to customers. These services may include, but are not limited to applications for creating, consuming, and/or modifying content, file storage and management platforms, collaboration and communications platforms, and other types of software as a service. The architecture of a typical cloud-based service includes numerous servers, network devices, and storage elements to support the services provided. These devices include software, data, and configuration files that need to be periodically updated to add new features, to roll out fixes to software and/or configuration. Furthermore, some services may support software installed on the client devices, and this software may also need to be updated to a newer version to support added features and/or to fix problems associated with a current version of the software.

Updates are typically rolled out in multiple stages to different groups of users to mitigate the risk of deploying the new version of the software and/or configuration data. This approach is referred to as ring deployment. The deployment process is represented by an expanding series of rings, where each ring includes deploying the update to a larger subset of the userbase being provided access to the update. The underlying hardware and software that support the subset of the userbase associated with the ring is updated. User feedback and telemetry data may be collected from users associated with each ring to determine whether the new version of the software is operating correctly before deploying the updates to the next ring. This process may continue until the update are deployed across the entire userbase.

Current approaches deploy updates sequentially across the various systems of the cloud-based service, which creates a single point of failure for the deployment of updates. Multiple versions of an update may be ready for simultaneous deployment to different rings of the cloud-based service. However, if a first version of the software introduces a regression, in which a feature that was previously working stops working, the deployment of the other versions of the update to other rings may also be halted whether these updates include the feature for which the regression was introduced. In a typical cloud-based service, there may be multiple updates that need to be deployed that each include multiple versions. Consequently, a failed deployment may incapacitate the entire deployment framework and introduce significant delays in the deployment of other scheduled updates. Hence, there is a need for improved systems and methods for deploying updates to cloud services.

SUMMARY

An example data processing system according to the disclosure may include a processor and a machine-readable medium storing executable instructions. The instructions when executed cause the processor to perform operations including obtaining policy information for an update to be deployed to one or more components of a cloud-based service, the policy information identifying a plurality of rings of the cloud-based service to which the update is to be deployed; analyzing the policy information to determine configuration information for a plurality of installer instances, wherein each installer instance is associated with one or more rings or one or more stages of a ring to which the update is to be deployed; obtaining payload information for each respective installer instance of the plurality of installer instances, the payload information indicating one or more payloads associated with the update to be deployed to the respective one or more rings or one or more stages of the ring associated with the respective installer instance; and deploying the one or more payloads for each of the one or more rings or the one or more stages of the ring associated with each installer instance.

An example method implemented in a data processing system for deploying an update to a cloud-based service includes obtaining policy information for an update to be deployed to one or more components of the cloud-based service, the policy information identifying a plurality of rings of the cloud-based service to which the update is to be deployed; analyzing the policy information to determine configuration information for a plurality of installer instances, wherein each installer instance is associated with one or more rings or one or more stages of a ring to which the update is to be deployed; obtaining payload information for each respective installer instance of the plurality of installer instances, the payload information indicating one or more payloads associated with the update to be deployed to the respective one or more rings or one or more stages of the ring associated with the respective installer instance; and deploying the one or more payloads for each of the one or more rings or the one or more stages of the ring associated with each installer instance.

An example machine-readable medium on which are stored instructions. The instructions when executed cause a processor of a programmable device to perform operations of obtaining policy information for an update to be deployed to one or more components of a cloud-based service, the policy information identifying a plurality of rings of the cloud-based service to which the update is to be deployed; analyzing the policy information to determine configuration information for a plurality of installer instances, wherein each installer instance is associated with one or more rings or one or more stages of a ring to which the update is to be deployed; obtaining payload information for each respective installer instance of the plurality of installer instances, the payload information indicating one or more payloads associated with the update to be deployed to the respective one or more rings or one or more stages of the ring associated with the respective installer instance; and deploying the one or more payloads for each of the one or more rings or the one or more stages of the ring associated with each installer instance.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIGS. 5A, 5B, 5C, and 5D are diagrams showing example scenarios that may occur during the deployment of an update to the cloud-based service.

FIG. 9 is a diagram of an example user interface in which an administrator may provide information about a build.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Techniques for scalable, secure, and reliable policy-based update deployments to a cloud-based service are provided. A scalable deployment framework is provided that automatically adapts to changing deployment policies and/or changes to the deployment ring structure without requiring human intervention. The deployment framework provides parallel deployment of updates to each ring and/or one or more stages of each ring. The deployment framework may use load balancing to distribute the deployment tasks across multiple installer instances to avoid potential bottlenecks that may slow down the deployment of updates to the cloud-based service. This approach also permits the deployment framework to rapidly recover from failed updates to a ring or one or more stages thereof. The deployment framework may extend the ring boundary associated with one of the installer instances to deploy a functional update to the ring or one or more stages thereof that received the faulty update. A technical benefit of the deployment framework is that updates are deployed in a consistent, secure, and reliable manner across the cloud-based service. Another technical benefit of the deployment framework is a significantly improved user experience for users of the cloud-based service by ensuring that updates improve the functionality and stability of the cloud-based service. These and other technical benefits of the techniques disclosed herein will be evident from the discussion of the example implementations that follow.

Figure 1:
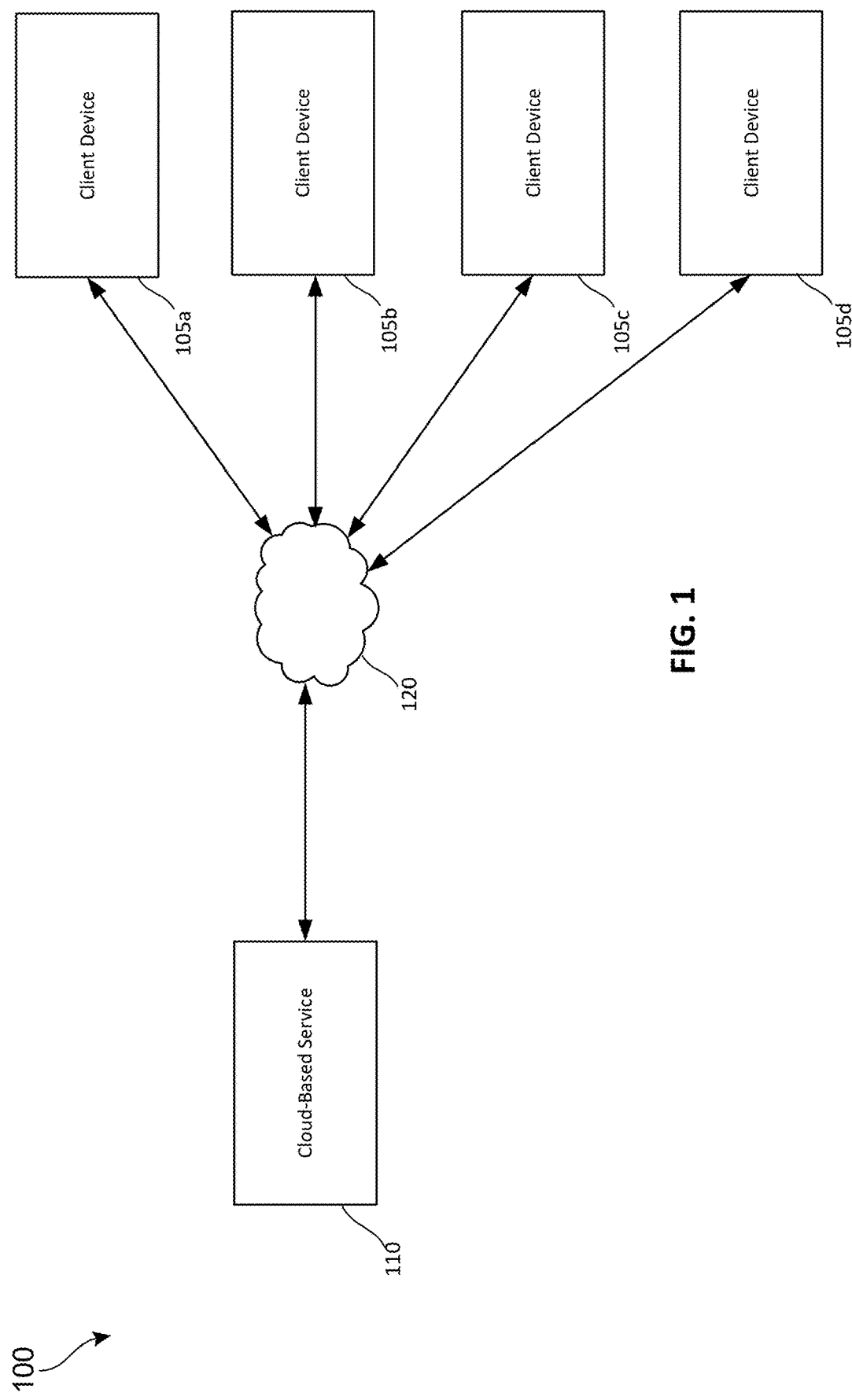
FIG. 1 is a diagram showing an example computing environment in which the techniques disclosed herein may be implemented.

FIG. 1 is a diagram showing an example computing environment 100 in which the techniques for implementing partitioned deployment policies for improved reliability of cloud-based services are provided may be implemented. The computing environment 100 may include a cloud-based service 110 that implements the techniques for executing the deployment policies described herein. The example computing environment 100 may also include one or more client devices, such as the client devices 105a, 105b, 105c, and 105d. The client devices 105a, 105b, 105c, and 105d may communicate with the cloud-based service 110 via the network 120. The network 120 may be a dedicated private network and/or the combination of public and private networks commonly referred to as the Internet.

In the example shown in FIG. 1, the cloud-based service 110 is implemented as a cloud-based service or set of services. These services may include, but are not limited to, applications for creating, consuming, and/or modifying content, file storage and management platforms, collaboration and communications platforms, and other types of software as a service. The cloud-based service 110 may include numerous servers, network devices, storage elements and other components to support the various services that are provided by the cloud-based service 110. For example, the cloud-based service 110 may include one or more collections of computer servers, referred to as a server farm, which are configured to provide computational and/or storage resources for at least a portion of the services provided by the cloud-based service 110. The server farm may be configured to provide fail-over protection so that if a computer server within the server farm experiences a failure, the tasks assigned to that server are handed off to another computer server within the farm. The server farm may also be configured to such that one or more machines may be taken offline temporarily to facilitate updates to the software and/or configuration data of the servers. Other architectures are also possible, and the deployment policy generated for deploying an update to the cloud-based service 110 accounts for the specific architecture and configuration of the components thereof. Furthermore, the cloud-based service 110 may also include other hardware and software to support various processes and services that support and maintain the various components of the cloud-based service 110. The generation and execution of the deployment policy are discussed in detail in the examples which follow.

In some implementations, the deployment policy generation and execution functionality described as being implemented by the cloud-based service 110 may instead be implemented as a separate service (not shown in FIG. 1) that is configured to handle the deployment policy generation and execution for the cloud-based service 110 and/or other such services. In such an implementation, the deployment policy and generation and execute functionality may be offered as another cloud-based service.

The client devices 105a, 105b, 105c, and 105d (referred to collectively as client device 105) are computing devices that may be implemented as a portable electronic device, such as a mobile phone, a tablet computer, a laptop computer, a portable digital assistant device, a portable game console, and/or other such devices. The client device 105 may also be implemented in computing devices having other form factors, such as a desktop computer, vehicle onboard computing system, a kiosk, a point-of-sale system, a video game console, and/or other types of computing devices.

While the example implementation illustrated in FIG. 1 includes four client devices, other implementations may include a different number of client devices that may utilize the cloud-based service 110. Furthermore, in some implementations, some features of the services provided by the cloud-based service 110 may be implemented by a native application installed on the client device 105, and the native application may communicate with the cloud-based service 110 over a network connection to exchange data with the cloud-based service 110 and/or to access features implemented on the cloud-based service 110.

Figure 2A:
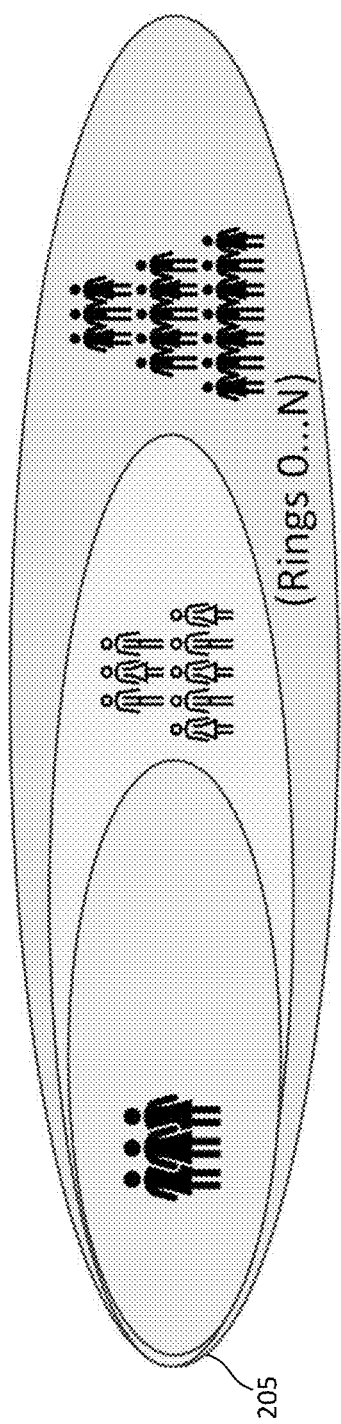
FIGS. 2A and 2B are diagrams showing example ring configurations for deploying updates on a cloud-based service architecture.

FIG. 2A is a diagram showing a representation of a ring configuration 205 for deploying updates on a cloud-based architecture, such as that of the cloud-based service 110 shown in FIG. 1. Each ring may be associated with a number of users of the services provided by the cloud-based service 110. The number of users associated with each subsequent ring may be increased until the entire userbase has access to the updates that are being deployed. The number of rings associated with a particular deployment may depend upon the specific update to be deployed, the architecture of the cloud-based service 110, the risk associated with the specific update, and/or other factors that will be discussed in detail in the examples which follow. The cloud-based service 110 may be configured to receive telemetry data associated with the updated software and/or user feedback data indicative of the performance of the updates as the updates are deployed to each ring. The cloud-based service 110 may be configured to halt further deployment of the updates in response to the telemetry data and/or the user feedback data indicated that the updates are not operating as expected. The cloud-based service 110 may be configured to expand the rollout to the next ring in response to the telemetry data and/or user feedback indicating that the updates appear to be operating correctly.

Each ring may include a subset of servers and/or other components onto which the updates are deployed to provide the selected subset of users associated with each ring that are provided the updates. Furthermore, the rings earlier in the sequence of rings may include users that are specially selected for initial testing of the updates. For example, users associated with a company or other organization that provides the cloud-based service 110, and employees or other users associated with the company or organization may be included in the original ring or the earlier rings in the sequence. The rings may also be subdivided into multiple stages. Each stage may include a subset of the userbase. The deployment framework provided herein may be configured to selectively deploy specific versions of the update to specific rings and/or to stages of the rings based on the deployment policy associated with the update. Different builds may be deployed to different rings and/or stages of rings to provide certain features to certain users of the userbase. For example, certain users may have access to a version of an application that has certain features that may not be provided in other versions of the application. Furthermore, certain features may not be available to users in certain regions for legal or compliance reasons. For example, privacy laws may prohibit the collection of certain types of telemetry data from the client device 105 of the user, and the version of the update deployed to such regions omit the functionality associated with the prohibited types of telemetry data. These examples illustrate how the deployment policy for an update may be customized so that the deployment framework can deploy different versions of the build to different rings and/or stages of the rings.

Figure 2B:
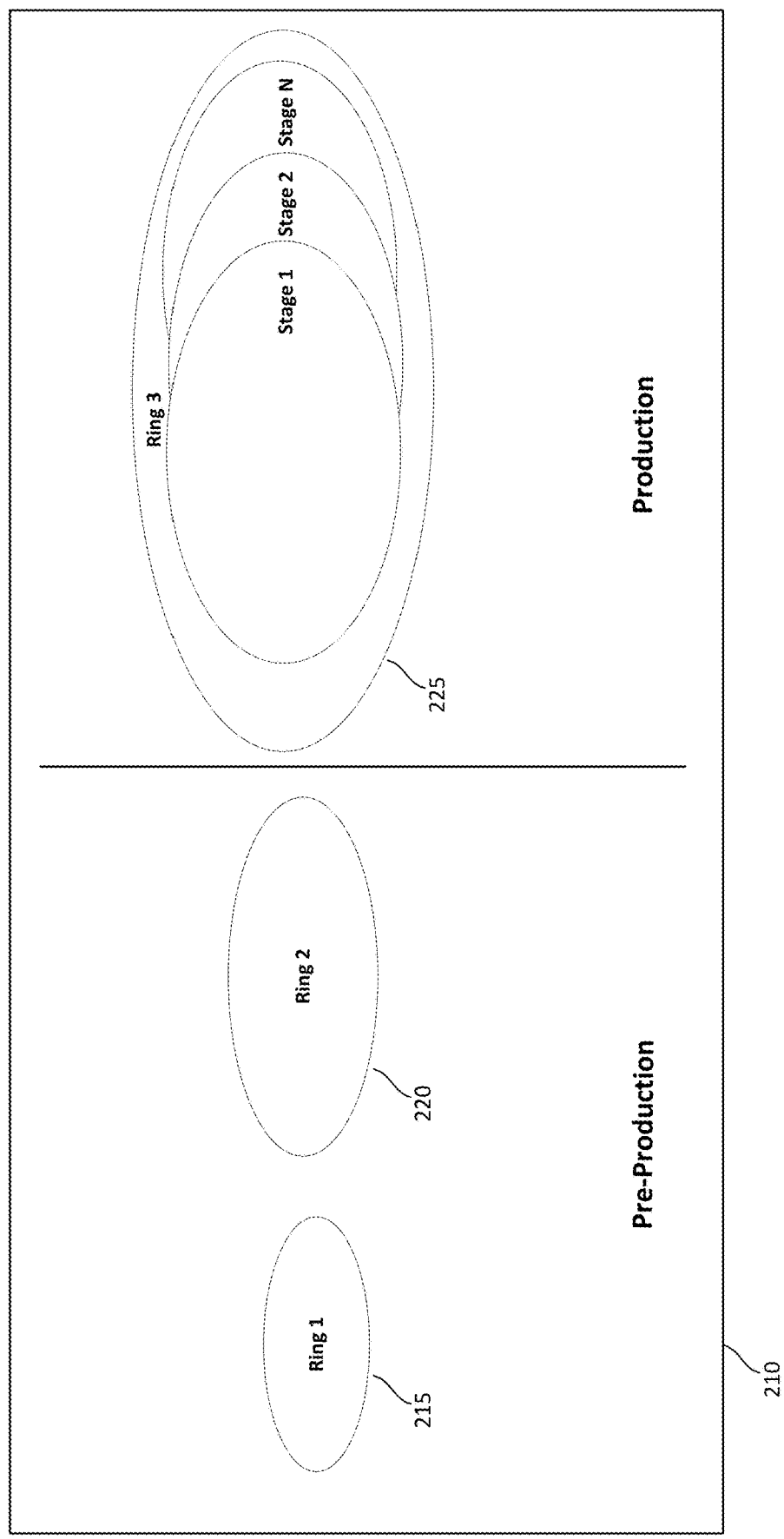

FIG. 2B is a diagram showing a representation of another example ring configuration 210 for deploying updates on a cloud-based architecture, such as that of the cloud-based service 110 shown in FIG. 1. The ring configuration 210 includes three rings 215, 220, and 225. In this example configuration, the first ring 215 and the second ring 220 are associated with users in the pre-production environments in which the updates may be tested by users before deploying the updates to a production environment in which users who are customers of the organization are provided access to the updates. In this example, the first ring 215 is associated with first internal group of users associated with the organization. These users may include members of the development team, testing team, and/or others who have been selected as a first set of users to receive and utilize the update. The computing devices of the users and/or components of the cloud-based service 110 may provide telemetry data. The users themselves may be prompted to provide by the cloud-based service 110 to provide feedback on the update. This telemetry data and/or the user feedback may be analyzed to determine whether the updates are operating as expected. The cloud-based service 110 may halt the deployment to the subsequent rings of the ring configuration 210 in response to determining that the updates are not operating as expected. Otherwise, the deployment process may continue with deploying the updates to the second ring 220 and the third ring 225 upon completion of the updates to the second ring 220.

In the example shown in FIG. 2B, the updates are rolled out to additional users within the preproduction environment. In this example, the organization has many employees who are also users of the services provided by the cloud-based service 110. For example, the first ring 215 in this example includes approximately 20,000 users and the second ring 220 in this example includes approximately 100,000 users associated with the organization. The preproduction environment in this example may be implemented on a separate server and/or sets of servers than the production environment, and the updates may initially be deployed to the server or servers associated with the preproduction environment. In other implementations, the same server or set of servers may provide services to both the preproduction and production environments, and users are directed to the appropriate version of the software based on the group with which the users are associated. Telemetry and user data may be collected from the users associated with the second ring 220, and the cloud-based service 110 may halt the deployment to the subsequent rings of the ring configuration 210 in response to determining that the updates are not operating as expected. Otherwise, the deployment process may continue with deploying the updates to the third ring 225.

The third ring 225 includes users that are using one or more production versions of the application or applications provided by the cloud-based service 110. Thus, the third ring 225 includes users that are outside of organization and are customers who subscribe to the services provided by the cloud-based service 110. The third ring 225 may include a very large number of users. In this example, the third ring 225 may include millions or even billions of users. Thus, the third ring 225 may be further subdivided into stages, and each stage includes a subset of the users that make up the third ring 225. These stages may be used to gradually roll out the updates out to full userbase and to provide another opportunity to collect and analyze telemetry data and/or user feedback from a broader userbase before deploying the updates to all users. Furthermore, each of the stages may represent ring internal ring boundaries used to subdivide the production userbase into logical groupings of users that utilized a specific production version. As discussed above, these subgroups of users may be determined based on the functionality available to the users within a particular subgroup. Certain users may receive certain features that are not available to users in other subgroups. Some users may have accessed to customized version of the software for a particular corporation or other organization and/or may have licensed a premium version of the application or applications provided by the cloud-based service 110 that include additional features. The subgroups may also be based on legal considerations. As discussed in the preceding examples, certain features of the application or applications may be precluded from certain countries or regions due legal requirements, and the version of the update deployed to such reasons will not include these features.

Whereas the example shown in FIG. 2B includes three rings, other implementations may utilize a different number of rings based on the size of the userbase, complexity, and risk associated with the deployment.

Figure 3:
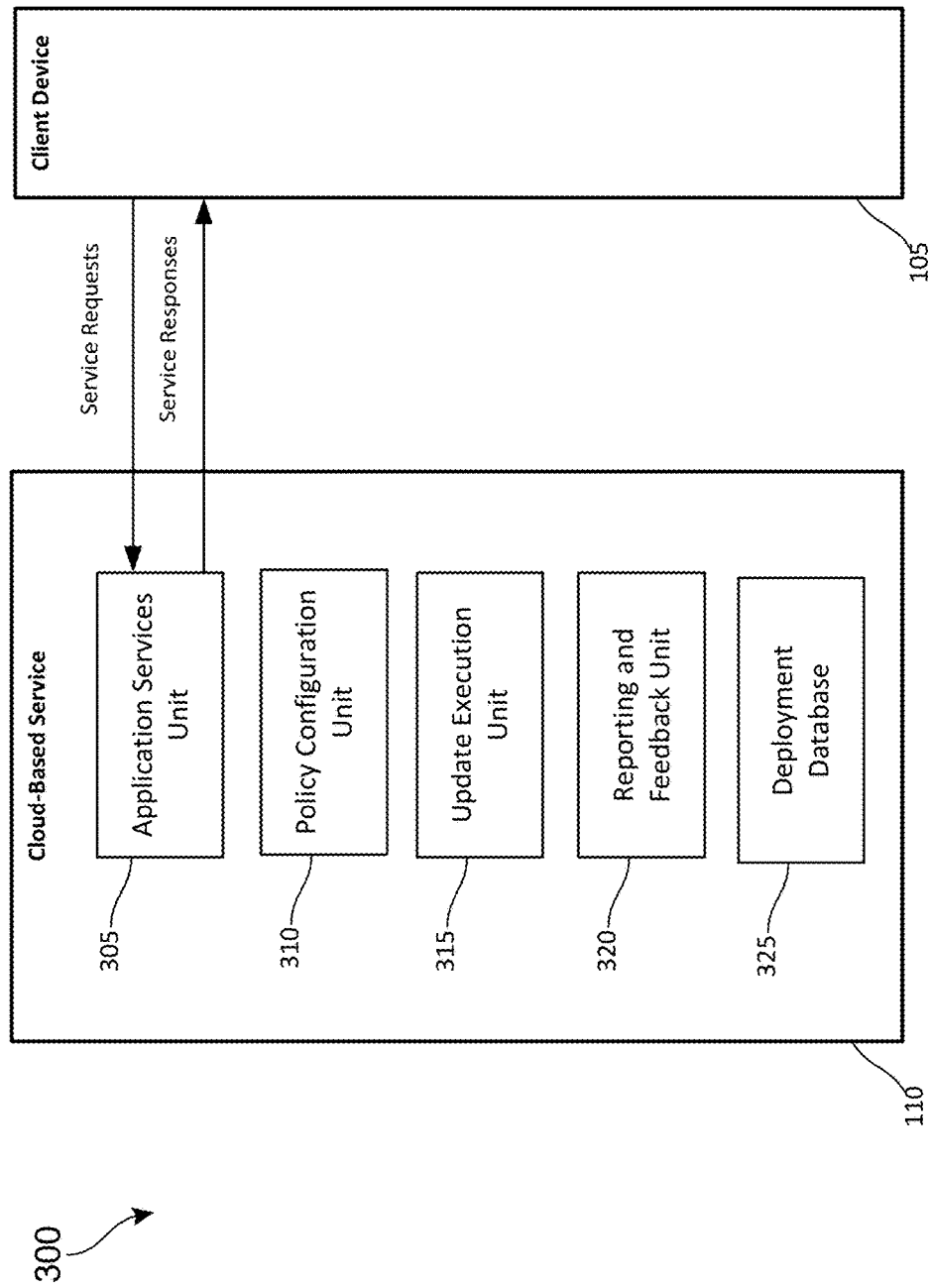
FIG. 3 is an example architecture that may be used, at least in part, to implement the cloud-based service shown in FIG. 1.

FIG. 3 is an example architecture 300 that may be used, at least in part, to implement the cloud-based service 110. The cloud-based service 110 may include an application service unit 305, a policy configuration unit 310, an update execution unit 315, a reporting and feedback unit 320, and a deployment database 325.

The application service unit 305 may be configured to provide the various services offered to customers of the cloud-based service 110. The application service unit 305 may be configured to receive service requests from the client devices 105 of users and to provide service responses to the client devices 105 of the users. The specific types of services provided by the cloud-based service 110 may vary. These services may include but are not limited to providing applications for creating, consuming, and/or modifying content, file storage and management platforms, collaboration and communications platforms, and other types of software as a service.

The policy configuration unit 310, the update execution unit 315, the reporting and feedback unit 320, and the deployment database 325 are configured to provide the policy generation and execution functionality provided herein. In the example shown in FIG. 3, the policy generation and execution functionality are implemented on the cloud-based service 110 for which these functions are being performed. In other implementations, the deployment policy generation and execution functionality may be provided, at least in part, by separate service.

The policy configuration unit 310 is configured to receive a build policy configuration information about the update to be deployed. The cloud-based service 110 may provide a user interface, such as the example user interface 900 shown in FIG. 9, in which an administrator may provide information about the build. The user interface 900 may include options for specifying one or more target rings and/or stages of the one or more rings. The user interface 900 may also provide means for inputting when then update should be deployed. The deployment of the update may be scheduled to be deployed immediately or on a specific day or time. The scheduling feature may be useful for deploying updates that include new features that are to be made available to users on a specific date. The user interface 900 may also provide means for selecting the payload of the update to be deployed. The payload may include executable program content, scripts, and/or configuration data that may be deployed as part of the update. The payload may include multiple new features and/or fixes for problems. The policy configuration unit 310 may create a deployment policy for the build based on the information provided by the administrator via the user interface 900.

The update execution unit 315 is configured to execute the deployment policies generated by the policy configuration unit 310. The execution of the deployment policies created by the policy configuration unit 310 is discussed in greater detail with respect to FIG. 4

The reporting and feedback unit 320 is configured to receive telemetry data from components of the cloud-based service 110 and/or client devices 105 of users. The reporting and feedback unit 320 may be configured to analyze the telemetry data and/or user feedback received, to generate reports that show the performance of the update that has been deployed based on the analyzed data, and to automatically perform various actions in response to determining that the updates are not performing as desired.

The deployment database 325 may be a database configured to store deployment policy information generated by the policy configuration unit 310 and data associated with the execution of the deployment policy. The deployment database 325 record for a deployment policy may include the location and/or file names of the payload to be deployed as the updates. Additional details of the information that may be stored in the deployment database 325 is described in greater detail in the discussion of FIG. 4 which follows.

Figure 4:
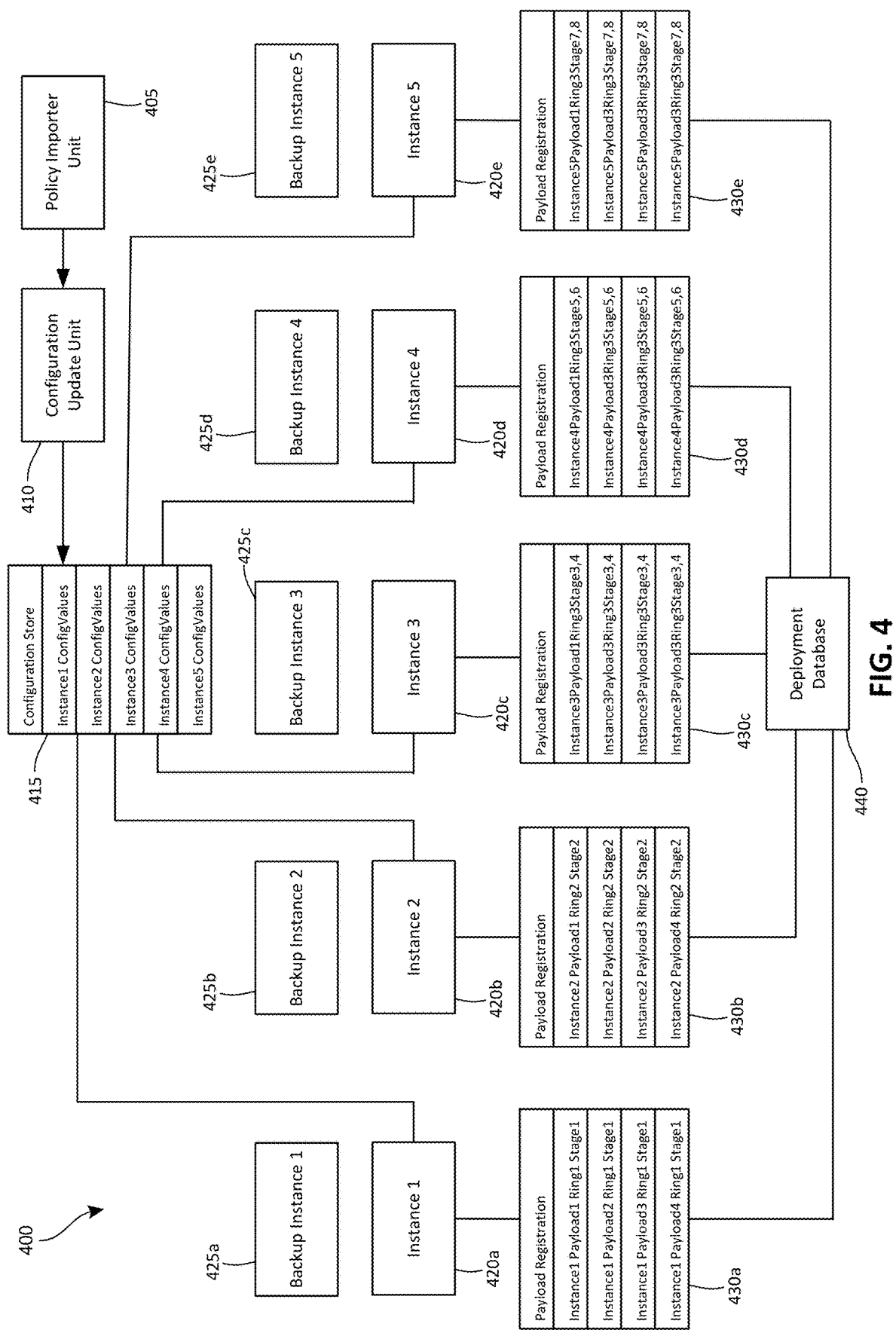
FIG. 4 is a diagram showing additional details of the update execution unit of the cloud-based service 110.

FIG. 4 is an example architecture 400 that may be used, at least in part, to implement the update execution unit 315 shown in FIG. 3. The architecture 400 includes a policy importer unit 405, configuration update unit 410, a configuration datastore 415, installer instances 420a-420e, backup installer instances 425a-425e, payload registration information 430a-430b, and a deployment database 440. The example architecture 400 shown in FIG. 4 demonstrates the flexibility of the techniques provided herein. The architecture may be dynamically reconfigured to handle different ring configurations and deploying conditions.

The policy importer 405 is configured obtain policy information for an update to be deployed on the cloud-based service 110. The policy importer 405 may be configured to obtain the deployment policy for the update from the deployment database 325. The deployment policy may be created by an administrator of the cloud-based service 110 via the user interface 900 provided by the policy configuration unit 310. The policy importer 405 may output the deployment policy information to the configuration update unit 410.

The configuration update unit 410 may be configured to receive the deployment policy information from the policy importer unit 405 and to analyze the policy information to determine how the payloads associated with the update should be deployed to the cloud-based service 110. The configuration update unit 410 can adapt to changes in the ring structure to which the updates are to be deployed without any intervention from a human user. The configuration update unit 410 may be configured to determine how many installer instances should be initialized to support the deployment. While the example shown in FIG. 4 includes five installer instances, other implementations may include a different number of installer instances. The number of installer instances required may be determined based on the number of different ring boundaries to which the update is to be deployed. The configuration update unit 410 may be configured to allocate the rings and/or stages thereof to the installer instances so that the load on any one installer instance does not exceed a threshold percentage of the load. For example, if the threshold is set to 20%, no installer instance may be assigned a portion of the load associated with deploying the update that exceeds 20%. The configuration update unit 410 may allocate a sufficient number of installer instances to ensure that the anticipated load on any one instance does not exceed the threshold. This approach ensures that one of the installer instances is not overloaded and causes a bottleneck in the distribution. The configuration update unit 410 is configured to automatically instantiate the installer instances and the associate the installer instance with a particular ring or rings and/or stages thereof in response to changes to policy information being received.

The configuration update unit 410 may output configuration information for each of the installer instances 420a-420e. The configuration information may be stored in a configuration datastore 415. The configuration datastore 415 may be persistent data store of the cloud-based service 110 that may be used to store configuration information for the dynamic configuration used to deploy updates. The configuration information may indicate which rings and/or stages thereof with which each of the installer instances 420a-420e have been associated. The stages of a ring may be distributed among multiple installer instances for load balancing purposes to ensure that an installer instance does not become overloaded and become a bottleneck in the deployment framework. Each of the installer instances 420a-420e may deploy payloads associated with updates for their respective rings and/or stages thereof. The updates associated with each ring and/or stages of rings may be the same or may differ depending upon the deployment policy for the upgrade.

The installer instances 420a-420e are configured to receive the configured to obtain payload registration information 430a-430d from the deployment database 440. The deployment database 440 may be the deployment database 325 of the cloud-based service 110 shown in FIG. 3. The payload registration information associated with each of the installer instances indicates which payload or payloads are to be deployed by that installer instance and the ring boundaries within which the payload or payloads are to be deployed. For example, the payload registration 430a indicates that the installer instance 420a is to install the update on stage 1 of ring 1, and the update includes four payloads to be installed.

The payload registration information included in the deployment database 440 may be determined at least in part by the information obtained via the user interface 900 shown in FIG. 9. A user or other administrator may provide information indicating the rings and/or the stages of the rings to which the update should be deployed. In some implementations, the user may manually associate the payload or payloads with each ring or stage thereof to which the payloads are to be deployed. In other implementations, the user may indicate that an update should be deployed to a particular ring or stage thereof and the policy configuration unit 310 and/or other components of the cloud-based service 110 may be configured to map the payloads that include an appropriate release of the update for that ring or stage thereof. An update may include multiple payloads to be deployed. The installer instances 420a-420e may be configured to query the deployment database 440 to determine whether there is payload registration information that identifies pending payloads associated with an update to be deployed. The payload registration information may include information that indicates where the payload are stored by the cloud-based service 110 so that the installer instances 420a-420e may access the payloads to be deployed.

The installer instances 420a-420e and the backup installer instances 425a-425e may spawned by the cloud-based service 110 in response to the configuration information for the deployment being added to the configuration datastore 415. Each of the installer instances 420a-420e and their respective backup installer instances 425a-425e may be instantiated on a server of a server farm associated with the ring on which the payloads associated with the update are to be installed. The installer instances 420a-420e may operate The backup installer instances 425a-425e are configured to take over processing in the event that the associated installer instance of the installer instances 420a-420e fails. The backup installer instances 425a-425e may be configured to operate using a previous stable version of the software used to implement the installer instances. This approach ensures that if an update is deployed to the deployment framework and the update experiences problems, the update will not cause the deployment framework itself to fail. The backup installer instance can take over processing of deployment requests until a fix can be deployed for the installer instances 420a-420e or the installer instances 420a-420e can be reverted to a working version of the software.

The installer instances 420a-420e may update the payload registration information associated with the installer instance in the deployment database 440 to indicate that the deployment has been completed. The reporting and feedback unit 320 may collect telemetry data and/or user feedback regarding the performance of the update and generate reports based on the collected data. The reports may be sent to the administrator that initiated the deployment of the update and/or to other specified users.

FIGS. 5A, 5B, 5C, and 5D are diagrams showing examples of several scenarios that may occur during the deployment of an update to the cloud-based services 110. The three example scenarios shown in FIGS. 5A, 5B, 5C, and 5D may be implemented by the configuration update unit 410 of the cloud-based services 110. These examples show how the ring boundaries may automatically be adjusted in response to detecting a regression in the release that has been deployed to one or more ring boundaries.

Figure 5A:
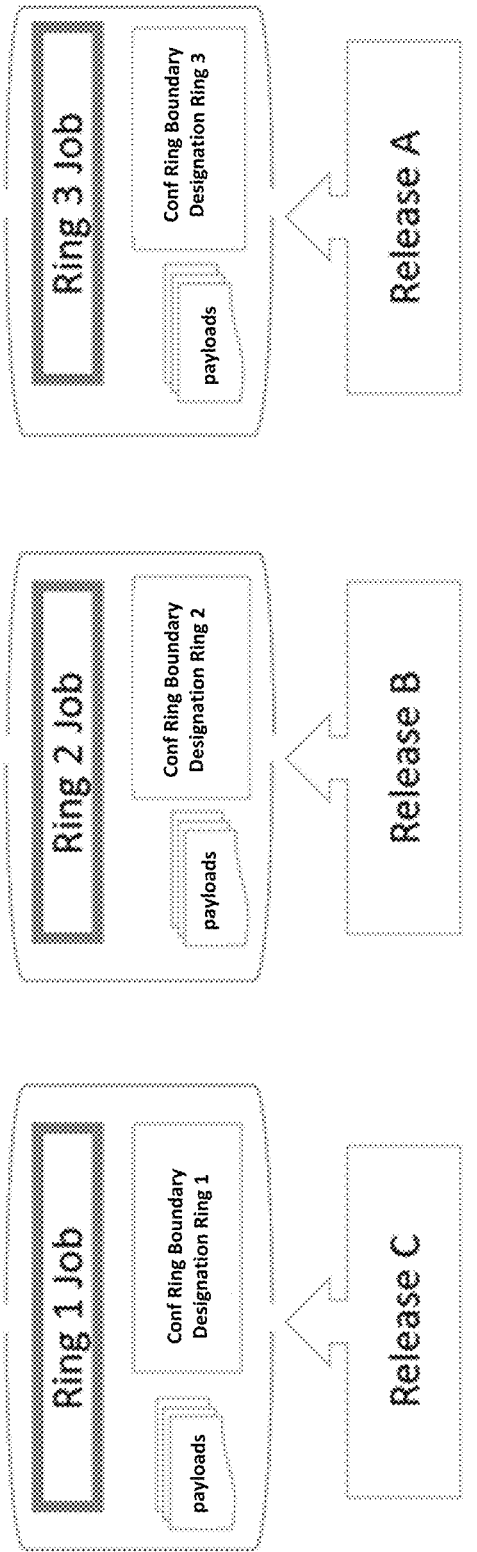

FIG. 5A shows an example of an update being successfully deployed to three different rings. The updated is being deployed in three releases: Release A, Release B, and Release C. Release A is deployed to Ring 3. Release B is deployed to Ring 2. Release C is deployed to Ring 1. In this example, the configuration update unit 410 would instantiate three installer instances, one for each of the three releases. In this example, all three of the releases are successfully deployed and no regressions are detected.

Figure 5B:
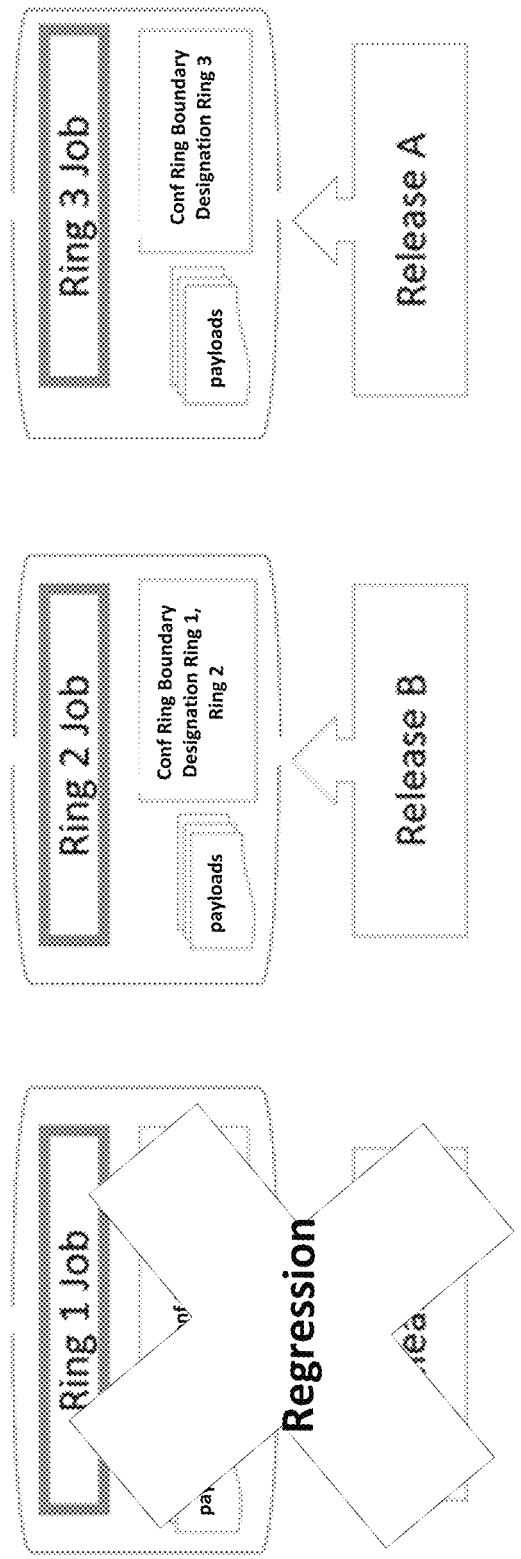

FIG. 5B shows another example of the example deployment shown in FIG. 5A but the Release C includes a regression. The regression may be detected based on telemetry data collected from the cloud-service components which were updated. Release A to Ring 3 and Release B to Ring 2 were deployed successfully and no regressions were detected. In this scenario, the ring boundary designations associated with the Ring 2 installer instance are extended to include to the Ring 1, and the Ring 2 installer instance deploys the payloads associated with Release B to both Rings 1 and 2. The reporting and feedback unit 320 may detect the regression in Release C and output a signal to the configuration update unit 410 to temporarily update the configuration information associated with the updates to be deployed to indicate that the ring boundaries associated with the Ring 2 installer instance extend both the Ring 1 and Ring 2 ring boundaries. The Ring 2 installer instance may handle the deployment of the updates to both Rings 1 and 2 until the issued with Release C are corrected. The Ring 2 installer instance may temporarily handle deployments to the Ring 1 until a new instance of the Ring 1 installer is initialized with new payloads for deployment to Ring 1.

FIG. 5C shows another example of the update shown in FIG. 5A but the Release B includes a regression. The Release C deployed to the Ring 1 includes a hotfix, also referred to as a patch, which corrects the regression. In this instance, the ring boundary designations associated with the Ring 1 installer instance are extended to include the Ring 2. The Ring 1 installer instance may then temporarily handle the deployment of update payloads to both Ring 1 and Ring 2. As discussed in the preceding example, the configuration values for the Ring 1 installer instance can be updated to include the boundaries for both Ring 1 and Ring 2. The Ring 1 installer instance may temporarily handle deployments to the Ring 2 until a new instance of the Ring 2 installer is initialized with new payloads for deployment to Ring 2.

FIG. 5D shows another example of the update shown in FIG. 5A but both the Release B and Release C include a regression. Release B and Release C both include a regression. In this instance, the ring boundary designations associated with the Ring 3 installer instance may be extended to incorporate Ring 1 and Ring 2. The Ring 3 installer instance may then temporarily handle the deployment of update payloads to Ring 1, Ring 2, and Ring 3. The Ring 3 installer instance may temporarily handle deployments to Ring 1 and to Ring 2 until a new instance of the Ring 1 installer and the Ring 2 installer are initialized.

The examples shown in FIGS. 5A-5D shown the adaptability of the deployment framework. The framework can dynamically adjust the ring boundaries to which the installer instances may install updates upon determining that a particular release associated with an update including a regression. A technical benefit of this approach is that the deployment framework may continue to operate and deploy updates to the cloud-based service 110. The configuration update unit 410 may be configured to select an installer instance to take on the deployments based on the load on each of the installer instances. As discussed above, the configuration update unit 410 attempts to balance the load on each of the installer instances so that one installer instance does not become overloaded and create a bottleneck in the deployment framework.

Figure 6:
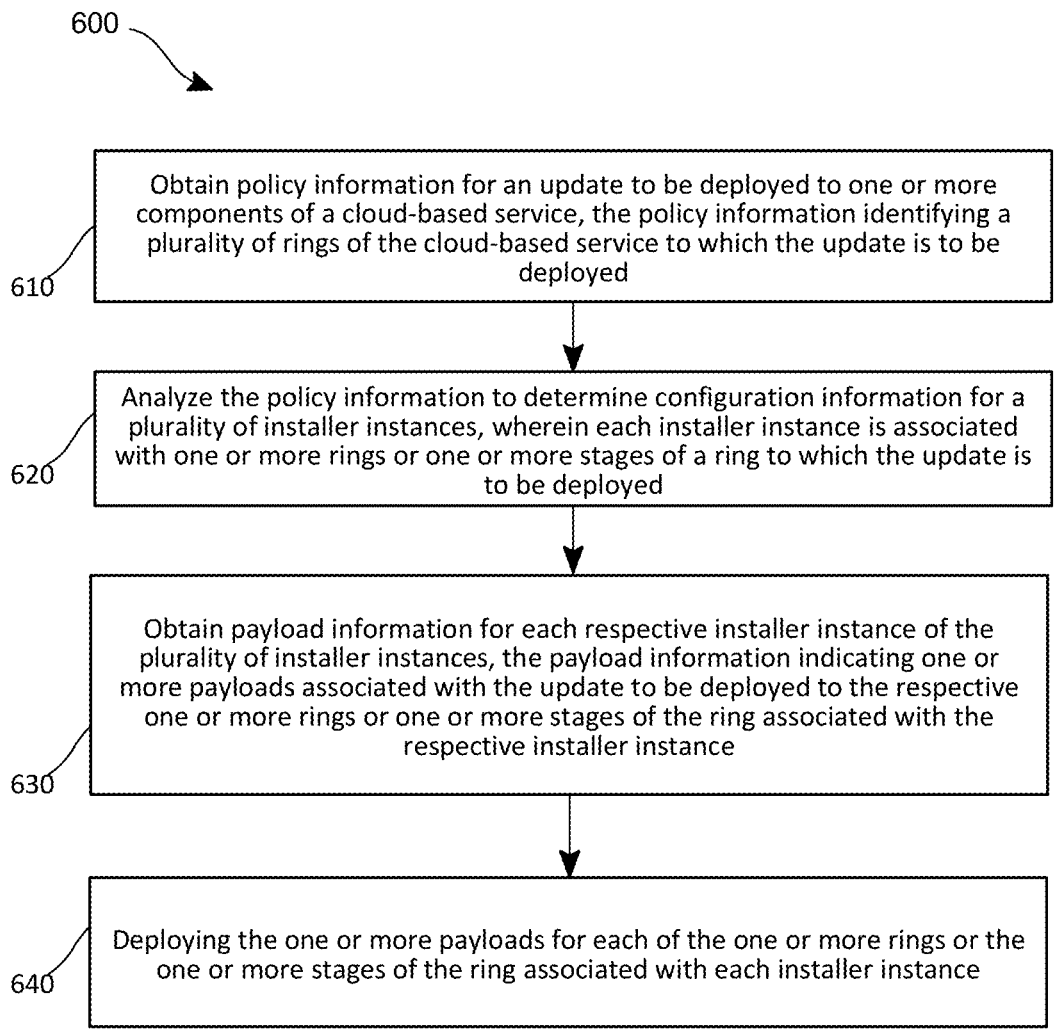
FIG. 6 is a flow diagram of a policy-based process for deploying updates to a cloud-based service.

FIG. 6 is a flow chart of an example process 600. The process 600 may be implemented by the cloud-based service 110. The process 600 may be used to generate and execute deployment policies for the cloud-based service 110. In some implementations, the process 600 may be implement by a deployment service that is separate from the cloud-based service 110.

The process 600 may include an operation 610 of obtaining policy information for an update to be deployed to one or more components of a cloud-based service. The policy information identifies a plurality of rings of the cloud-based service to which the update is to be deployed. As discussed in the preceding examples, the policy configuration unit 310 is configured to receive a build policy configuration information about the update to be deployed and may receive this information via the user interface 900 shown in FIG. 9. The administrator or other user setting up the update to be deployed may also include information that identifies the rings and/or the stage of the rings to which the update is to be deployed.

The process 600 may include an operation 620 of analyzing the policy information to determine configuration information for a plurality of installer instances. Each installer instance is associated with one or more rings or one or more stages of a ring to which the update is to be deployed. As discussed with respect to FIG. 4, the configuration update unit 410 may output configuration information for each of the installer instances to be instantiated for the deployment of the updates. Each installer instance may be associated with a ring or a one or more stages of a ring. The configuration update unit 410 may allocate the rings or the stages of the rings to an installer instance based on an anticipated load associated with installing the update in that ring or one or more stages of ring. The configuration update unit 410 may attempt to balance the load among the installer instances by keeping the anticipated load associated with any one of the installer instances below a predetermined threshold.

The process 600 may include an operation 630 of obtaining payload information for each respective installer instance of the plurality of installer instances. The payload information indicating one or more payloads associated with the update to be deployed to the respective one or more rings or one or more stages of the ring associated with the respective installer instance. The installer instances may obtain the payload information from the deployment database 440.

The process 600 may include an operation 640 of deploying the one or more payloads for each of the one or more rings or the one or more stages of the ring associated with each installer instance. Once the installer instances have obtained the payload information for the respective rings or stages of rings to which the installer instances will be deploying the update, the payload instances may operate in parallel to execute the deployment of these payloads.

The detailed examples of systems, devices, and techniques described in connection with FIGS. 1-6 are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-6 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 7:
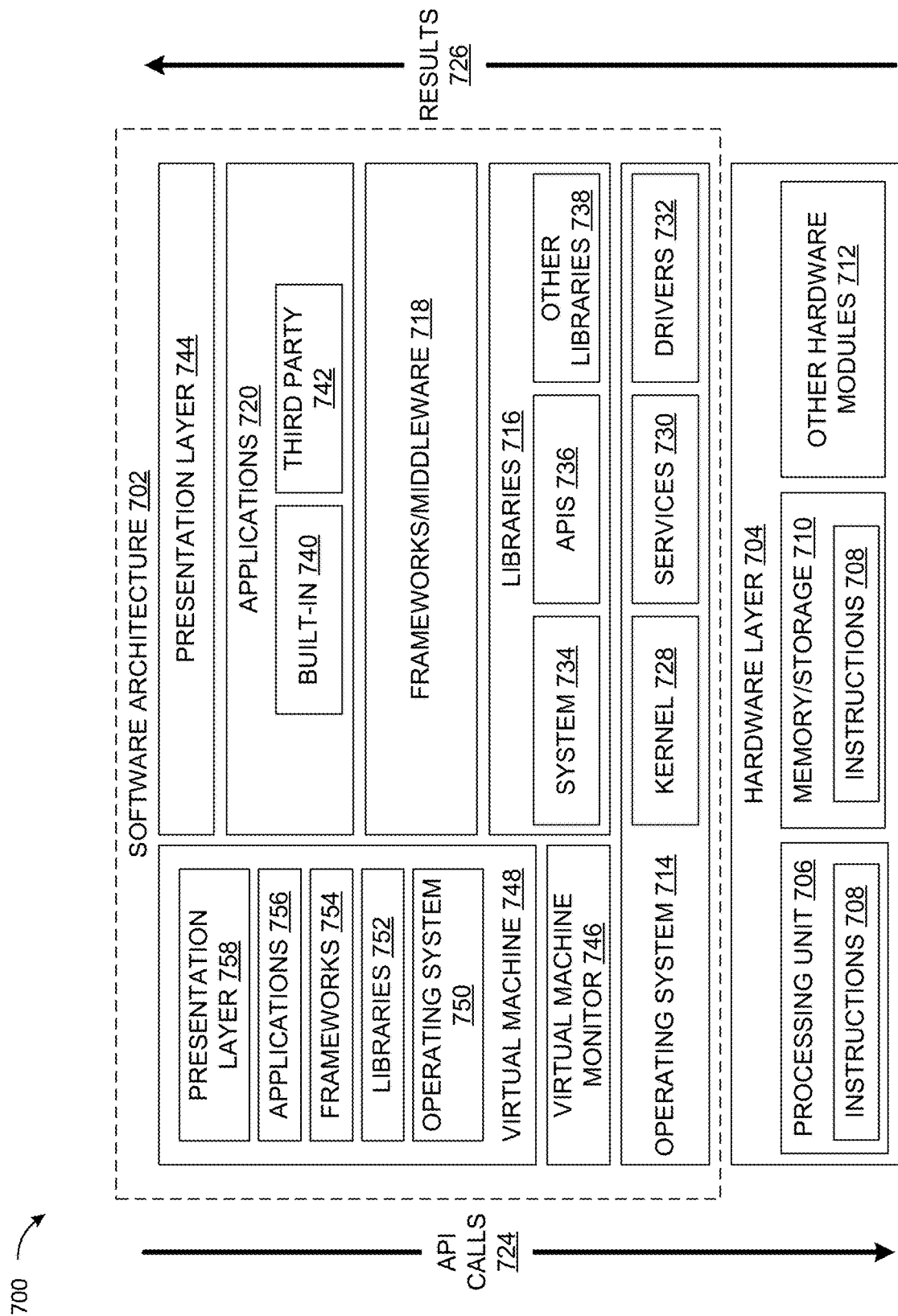
FIG. 7 is a block diagram showing an example software architecture, various portions of which may be used in conjunction with various hardware architectures herein described, which may implement any of the described features.

FIG. 7 is a block diagram 700 illustrating an example software architecture 702, various portions of which may be used in conjunction with various hardware architectures herein described, which may implement any of the above-described features. FIG. 7 is a non-limiting example of a software architecture, and it will be appreciated that many other architectures may be implemented to facilitate the functionality described herein. The software architecture 702 may execute on hardware such as a machine 800 of FIG. 8 that includes, among other things, processors 810, memory 830, and input/output (I/O) components 850. A representative hardware layer 704 is illustrated and can represent, for example, the machine 800 of FIG. 8. The representative hardware layer 704 includes a processing unit 706 and associated executable instructions 708. The executable instructions 708 represent executable instructions of the software architecture 702, including implementation of the methods, modules and so forth described herein. The hardware layer 704 also includes a memory/storage 710, which also includes the executable instructions 708 and accompanying data. The hardware layer 704 may also include other hardware modules 712. Instructions 708 held by processing unit 706 may be portions of instructions 708 held by the memory/storage 710.

The example software architecture 702 may be conceptualized as layers, each providing various functionality. For example, the software architecture 702 may include layers and components such as an operating system (OS) 714, libraries 716, frameworks 718, applications 720, and a presentation layer 744. Operationally, the applications 720 and/or other components within the layers may invoke API calls 724 to other layers and receive corresponding results 726. The layers illustrated are representative in nature and other software architectures may include additional or different layers. For example, some mobile or special purpose operating systems may not provide the frameworks/middleware 718.

The OS 714 may manage hardware resources and provide common services. The OS 714 may include, for example, a kernel 728, services 730, and drivers 732. The kernel 728 may act as an abstraction layer between the hardware layer 704 and other software layers. For example, the kernel 728 may be responsible for memory management, processor management (for example, scheduling), component management, networking, security settings, and so on. The services 730 may provide other common services for the other software layers. The drivers 732 may be responsible for controlling or interfacing with the underlying hardware layer 704. For instance, the drivers 732 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 716 may provide a common infrastructure that may be used by the applications 720 and/or other components and/or layers. The libraries 716 typically provide functionality for use by other software modules to perform tasks, rather than rather than interacting directly with the OS 714. The libraries 716 may include system libraries 734 (for example, C standard library) that may provide functions such as memory allocation, string manipulation, file operations. In addition, the libraries 716 may include API libraries 736 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 716 may also include a wide variety of other libraries 738 to provide many functions for applications 720 and other software modules.

The frameworks 718 (also sometimes referred to as middleware) provide a higher-level common infrastructure that may be used by the applications 720 and/or other software modules. For example, the frameworks 718 may provide various graphic user interface (GUI) functions, high-level resource management, or high-level location services. The frameworks 718 may provide a broad spectrum of other APIs for applications 720 and/or other software modules.

The applications 720 include built-in applications 740 and/or third-party applications 742. Examples of built-in applications 740 may include, but are not limited to, a contacts application, a browser application, a location application, a media application, a messaging application, and/or a game application. Third-party applications 742 may include any applications developed by an entity other than the vendor of the particular platform. The applications 720 may use functions available via OS 714, libraries 716, frameworks 718, and presentation layer 744 to create user interfaces to interact with users.

Some software architectures use virtual machines, as illustrated by a virtual machine 748. The virtual machine 748 provides an execution environment where applications/modules can execute as if they were executing on a hardware machine (such as the machine 800 of FIG. 8, for example). The virtual machine 748 may be hosted by a host OS (for example, OS 714) or hypervisor, and may have a virtual machine monitor 746 which manages operation of the virtual machine 748 and interoperation with the host operating system. A software architecture, which may be different from software architecture 702 outside of the virtual machine, executes within the virtual machine 748 such as an OS 750, libraries 752, frameworks 754, applications 756, and/or a presentation layer 758.

Figure 8:
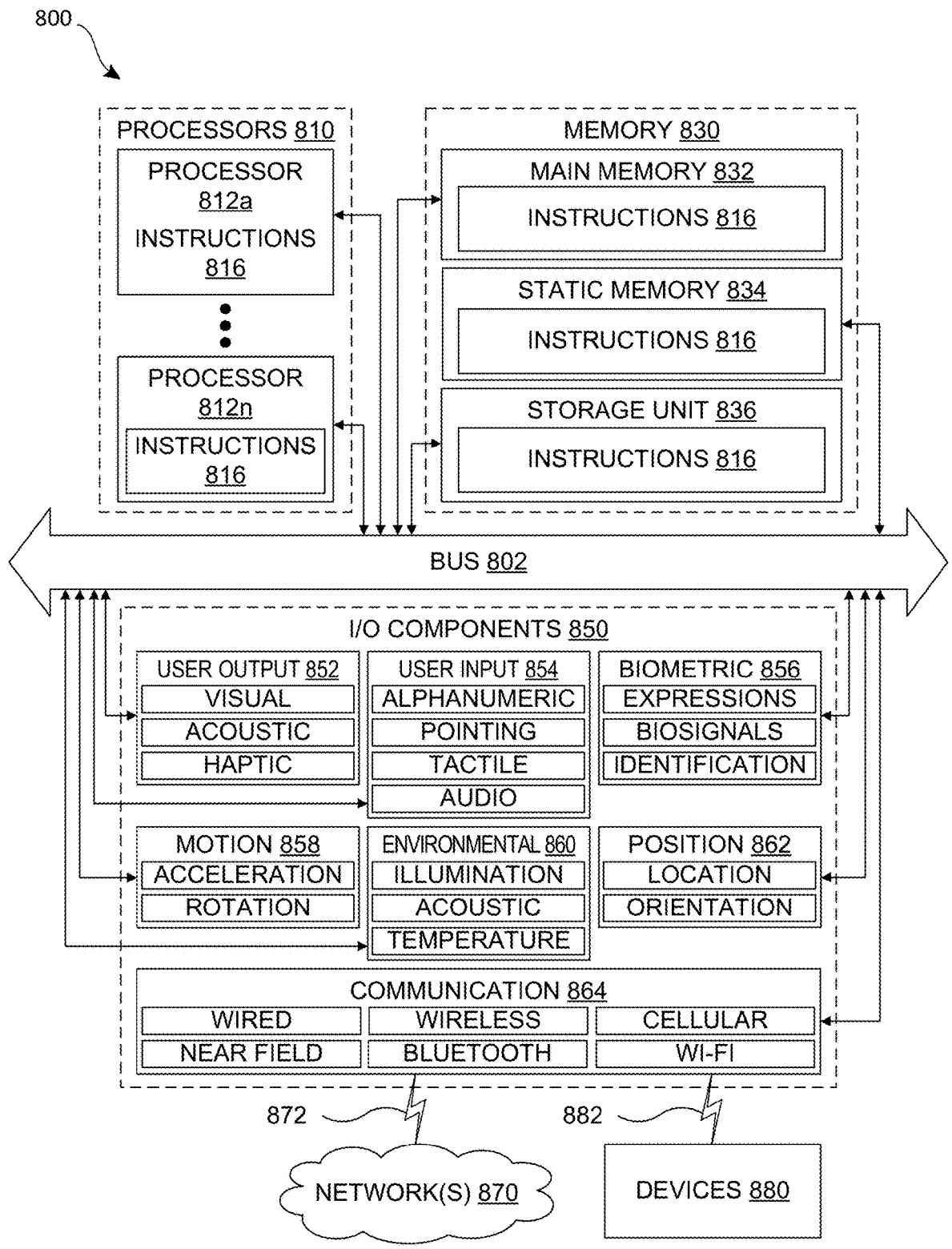
FIG. 8 is a block diagram showing components of an example machine configured to read instructions from a machine-readable medium and perform any of the features described herein.

FIG. 8 is a block diagram illustrating components of an example machine 800 configured to read instructions from a machine-readable medium (for example, a machine-readable storage medium) and perform any of the features described herein. The example machine 800 is in a form of a computer system, within which instructions 816 (for example, in the form of software components) for causing the machine 800 to perform any of the features described herein may be executed. As such, the instructions 816 may be used to implement modules or components described herein. The instructions 816 cause unprogrammed and/or unconfigured machine 800 to operate as a particular machine configured to carry out the described features. The machine 800 may be configured to operate as a standalone device or may be coupled (for example, networked) to other machines. In a networked deployment, the machine 800 may operate in the capacity of a server machine or a client machine in a server-client network environment, or as a node in a peer-to-peer or distributed network environment. Machine 800 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 800 is illustrated, the term "machine" includes a collection of machines that individually or jointly execute the instructions 816.

The machine 800 may include processors 810, memory 830, and I/O components 850, which may be communicatively coupled via, for example, a bus 802. The bus 802 may include multiple buses coupling various elements of machine 800 via various bus technologies and protocols. In an example, the processors 810 (including, for example, a central processing unit (CPU), a graphics processing unit (GPU), a digital signal processor (DSP), an ASIC, or a suitable combination thereof) may include one or more processors 812$a$ to 812$n$ that may execute the instructions 816 and process data. In some examples, one or more processors 810 may execute instructions provided or identified by one or more other processors 810. The term "processor" includes a multi-core processor including cores that may execute instructions contemporaneously. Although FIG. 8 shows multiple processors, the machine 800 may include a single processor with a single core, a single processor with multiple cores (for example, a multi-core processor), multiple processors each with a single core, multiple processors each with multiple cores, or any combination thereof. In some examples, the machine 800 may include multiple processors distributed among multiple machines.

The memory/storage 830 may include a main memory 832, a static memory 834, or other memory, and a storage unit 836, both accessible to the processors 810 such as via the bus 802. The storage unit 836 and memory 832, 834 store instructions 816 embodying any one or more of the functions described herein. The memory/storage 830 may also store temporary, intermediate, and/or long-term data for processors 810. The instructions 816 may also reside, completely or partially, within the memory 832, 834, within the storage unit 836, within at least one of the processors 810 (for example, within a command buffer or cache memory), within memory at least one of I/O components 850, or any suitable combination thereof, during execution thereof. Accordingly, the memory 832, 834, the storage unit 836, memory in processors 810, and memory in I/O components 850 are examples of machine-readable media.

As used herein, "machine-readable medium" refers to a device able to temporarily or permanently store instructions and data that cause machine 800 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 816) for execution by a machine 800 such that the instructions, when executed by one or more processors 810 of the machine 800, cause the machine 800 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 850 may include a wide variety of hardware components adapted to receive input, provide output, produce output, transmit information, exchange information, capture measurements, and so on. The specific I/O components 850 included in a particular machine will depend on the type and/or function of the machine. For example, mobile devices such as mobile phones may include a touch input device, whereas a headless server or IoT device may not include such a touch input device. The particular examples of I/O components illustrated in FIG. 8 are in no way limiting, and other types of components may be included in machine 800. The grouping of I/O components 850 are merely for simplifying this discussion, and the grouping is in no way limiting. In various examples, the I/O components 850 may include user output components 852 and user input components 854. User output components 852 may include, for example, display components for displaying information (for example, a liquid crystal display (LCD) or a projector), acoustic components (for example, speakers), haptic components (for example, a vibratory motor or force-feedback device), and/or other signal generators. User input components 854 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 850 may include biometric components 856, motion components 858, environmental components 860, and/or position components 862, among a wide array of other physical sensor components. The biometric components 856 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 858 may include, for example, acceleration sensors (for example, an accelerometer) and rotation sensors (for example, a gyroscope). The environmental components 860 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 862 may include, for example, location sensors (for example, a Global Position System (GPS) receiver), altitude sensors (for example, an air pressure sensor from which altitude may be derived), and/or orientation sensors (for example, magnetometers).

The I/O components 850 may include communication components 864, implementing a wide variety of technologies operable to couple the machine 800 to network(s) 870 and/or device(s) 880 via respective communicative couplings 872 and 882. The communication components 864 may include one or more network interface components or other suitable devices to interface with the network(s) 870. The communication components 864 may include, for example, components adapted to provide wired communication, wireless communication, cellular communication, Near Field Communication (NFC), Bluetooth communication, Wi-Fi, and/or communication via other modalities. The device(s) 880 may include other machines or various peripheral devices (for example, coupled via USB).

In some examples, the communication components 864 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 862, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A method implemented in a data processing system for deploying an update to a cloud-based service, the method comprising:
    obtaining policy information for the update to be deployed to one or more components of the cloud-based service, the policy information identifying a plurality of rings of the cloud-based service to which the update is to be deployed;
    analyzing the policy information to determine configuration information for a plurality of installer instances, wherein each installer instance is associated with one or more rings or one or more stages of a ring to which the update is to be deployed;
    obtaining payload information for each respective installer instance of the plurality of installer instances, the payload information indicating one or more payloads associated with the update to be deployed to the respective one or more rings or one or more stages of the ring associated with the respective installer instance;
    deploying the one or more payloads for each of the one or more rings or the one or more stages of the ring associated with each installer instance;
    determining that a first payload deployed to a first ring or stage of a first ring has included a regression;
    deactivating a first installer instance associated with the first ring or stage upon determining the first payload included the regression;
    adjusting a ring boundary associated with a second installer instance to include the one or more rings or the one or more stages of the ring associated with the first installer instance; and
    deploying a second payload associated with the second installer instance to the one or more rings or the one or more stages of the ring associated with the first installer instance.

2. The method of claim 1, further comprising:
    instantiating a number of installer instances based on a number of rings included in the plurality of rings.

3. The method of claim 2, further comprising:
    instantiating the number of installer instances based at least in part on an anticipated load associated with each installer instance of the number of installer instances.

4. The method of claim 2, further comprising:
    instantiating a plurality of backup installer instances, each backup installer instance is associated with a respective installer instance of the plurality of installer instances, and a version of software executed by the plurality of backup installer instances is a previous stable version of software executed by the plurality of installer instances.

5. The method of claim 1, further comprising:
    determining that a respective installer instance of the plurality of installer instances has failed;
    activating a respective backup installer instance associated with the respective installer instance that has failed; and
    deploying one or more payloads associated with the update using the respective backup installer instance.

6. The method of claim 1, further comprising:
    collecting performance data for the one or more payloads deployed to each of the one or more rings or the one or more stages of the ring associated with each installer instance.

7. A data processing system comprising:
    a processor; and
    a machine-readable medium storing executable instructions that, when executed, cause the processor to perform operations comprising:
        obtaining policy information for an update to be deployed to one or more components of a cloud-based service, the policy information identifying a plurality of rings of the cloud-based service to which the update is to be deployed;
        analyzing the policy information to determine configuration information for a plurality of installer instances, wherein each installer instance is associated with one or more rings or one or more stages of a ring to which the update is to be deployed;
        obtaining payload information for each respective installer instance of the plurality of installer instances, the payload information indicating one or more payloads associated with the update to be deployed to the respective one or more rings or one or more stages of the ring associated with the respective installer instance;
        deploying the one or more payloads for each of the one or more rings or the one or more stages of the ring associated with each installer instance;
        determining that a first payload deployed to a first ring or stage of a first ring has included a regression;
        deactivating a first installer instance associated with the first ring or stage upon determining the first payload included the regression;
        adjusting a ring boundary associated with a second installer instance to include the one or more rings or the one or more stages of the ring associated with the first installer instance; and
        deploying a second payload associated with the second installer instance to the one or more rings or the one or more stages of the ring associated with the first installer instance.

8. The data processing system of claim 7, wherein the machine-readable medium includes instructions to cause the processor to perform operations of:
    instantiating a number of installer instances based on a number of rings included in the plurality of rings.

9. The data processing system of claim 8, wherein the machine-readable medium includes instructions to cause the processor to perform operations of:

instantiating the number of installer instances based at least in part on an anticipated load associated with each installer instance of the number of installer instances.

10. The data processing system of claim 8, wherein the machine-readable medium includes instructions to cause the processor to perform operations of:
instantiating a plurality of backup installer instances, each backup installer instance is associated with a respective installer instance of the plurality of installer instances, and a version of software executed by the plurality of backup installer instances is a previous stable version of software executed by the plurality of installer instances.

11. The data processing system of claim 10, wherein the machine-readable medium includes instructions to cause the processor to perform operations of:
determining that a respective installer instance of the plurality of installer instances has failed;
activating a respective backup installer instance associated with the respective installer instance that has failed; and
deploying one or more payloads associated with the update using the respective backup installer instance.

12. The data processing system of claim 7, wherein the machine-readable medium includes instructions to cause the processor to perform operations of:
collecting performance data for the one or more payloads deployed to each of the one or more rings or the one or more stages of the ring associated with each installer instance.

13. A machine-readable medium on which are stored instructions that, when executed, cause a processor of a programmable device to perform operations of:
obtaining policy information for an update to be deployed to one or more components of a cloud-based service, the policy information identifying a plurality of rings of the cloud-based service to which the update is to be deployed;
analyzing the policy information to determine configuration information for a plurality of installer instances, wherein each installer instance is associated with one or more rings or one or more stages of a ring to which the update is to be deployed;
obtaining payload information for each respective installer instance of the plurality of installer instances, the payload information indicating one or more payloads associated with the update to be deployed to the respective one or more rings or one or more stages of the ring associated with the respective installer instance;
deploying the one or more payloads for each of the one or more rings or the one or more stages of the ring associated with each installer instance;
determining that a first payload deployed to a first ring or stage of a first ring has included a regression;
deactivating a first installer instance associated with the first ring or stage upon determining the first payload included the regression;
adjusting a ring boundary associated with a second installer instance to include the one or more rings or the one or more stages of the ring associated with the first installer instance; and
deploying a second payload associated with the second installer instance to the one or more rings or the one or more stages of the ring associated with the first installer instance.

14. The machine-readable medium of claim 13, wherein the machine-readable medium includes instructions to cause the processor to perform operations of:
instantiating a number of installer instances based on a number of rings included in the plurality of rings.

15. The machine-readable medium of claim 14, wherein the machine-readable medium includes instructions to cause the processor to perform operations of:
instantiating the number of installer instances based at least in part on an anticipated load associated with each installer instance of the number of installer instances.

16. The machine-readable medium of claim 14, wherein the machine-readable medium includes instructions to cause the processor to perform operations of:
instantiating a plurality of backup installer instances, each backup installer instance is associated with a respective installer instance of the plurality of installer instances, and a version of software executed by the plurality of backup installer instances is a previous stable version of software executed by the plurality of installer instances.

17. The machine-readable medium of claim 13, wherein the machine-readable medium includes instructions to cause the processor to perform operations of:
determining that a respective installer instance of the plurality of installer instances has failed;
activating a respective backup installer instance associated with the respective installer instance that has failed; and
deploying one or more payloads associated with the update using the respective backup installer instance.

18. The machine-readable medium of claim 13, wherein the machine-readable medium includes instructions to cause the processor to perform operations of:
collecting performance data for the one or more payloads deployed to each of the one or more rings or the one or more stages of the ring associated with each installer instance.

* * * * *